No. 631,879. Patented Aug. 29, 1899.
R. REID.
VALVE FOR PNEUMATIC TIRES.
(Application filed Sept. 28, 1898.)
(No Model.) 2 Sheets—Sheet 1.
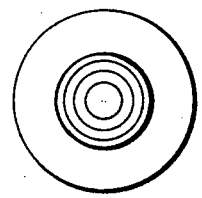
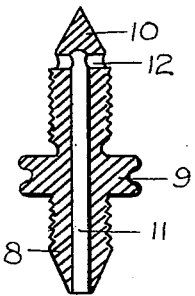
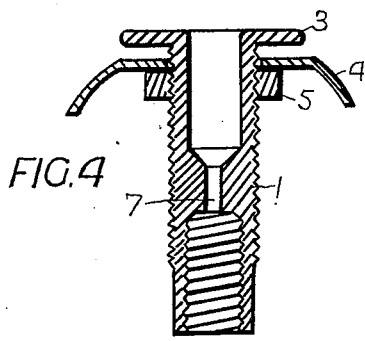
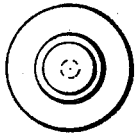
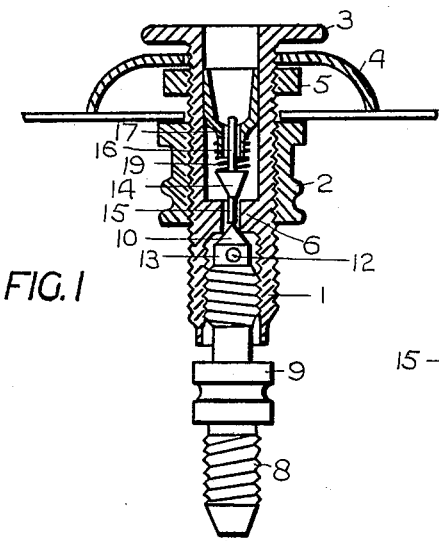
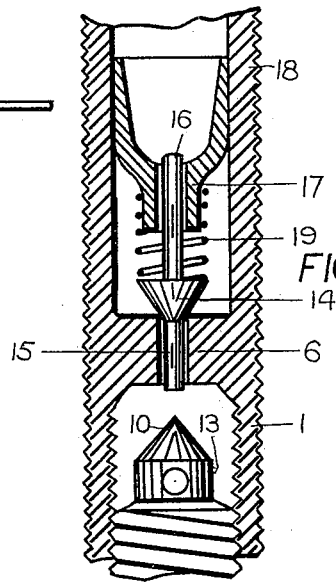
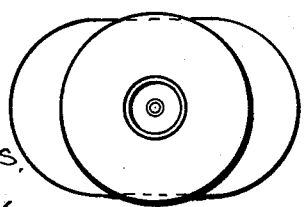
Witnesses
Inventor,
Robert Reid
By his Attorneys
Baldwin, Davidson & Wight
THE NORRIS PETERS CO., PHOTO-LITHO., WASHINGTON, D. C.

No. 631,879. Patented Aug. 29, 1899.
R. REID.
VALVE FOR PNEUMATIC TIRES.
(Application filed Sept. 28, 1898.)
(No Model.) 2 Sheets—Sheet 2.
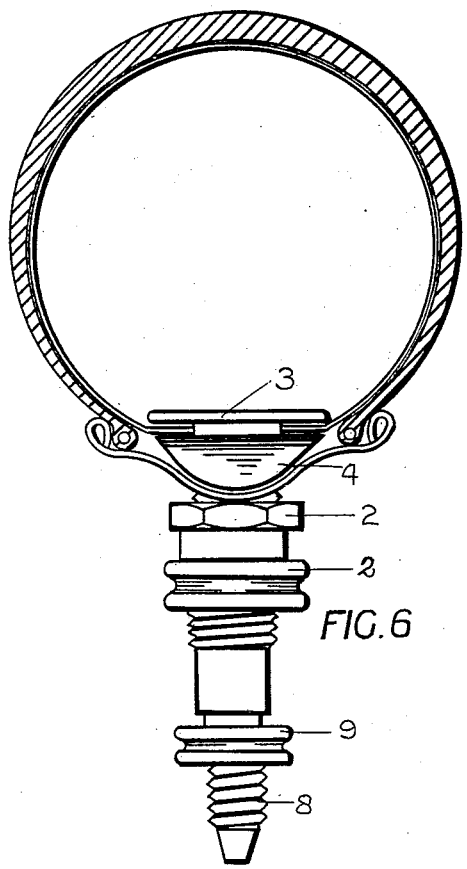
FIG. 6
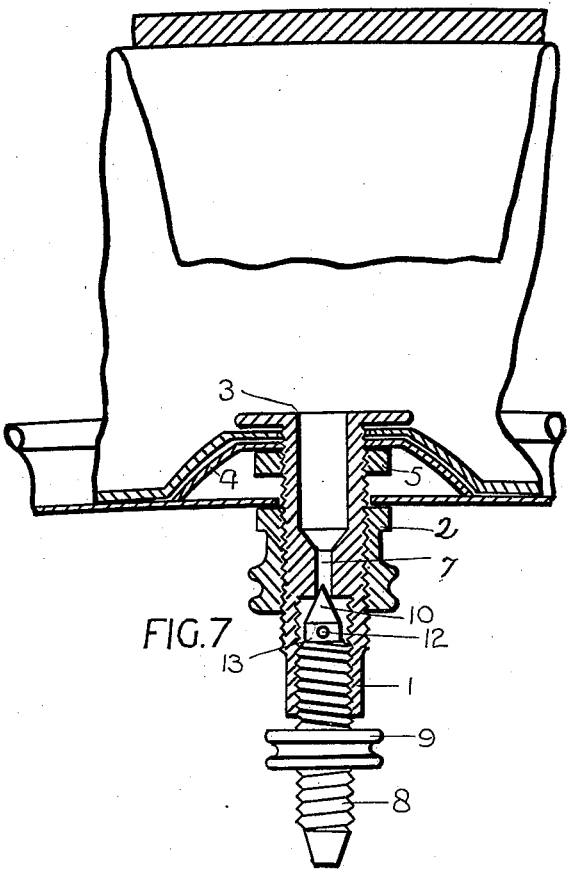
FIG. 7
FIG. 8
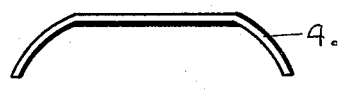
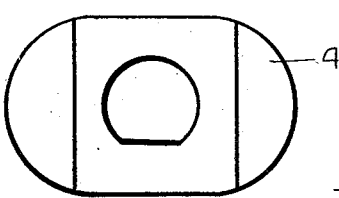
Witnesses
E. A. Balloch
Walter R. Gibbs
Inventor,
Robert Reid
By his Attorneys
Baldwin Davidson & Wight
THE NORRIS PETERS CO., PHOTO-LITHO., WASHINGTON, D. C.

UNITED STATES PATENT OFFICE.

ROBERT REID, OF MELBOURNE, VICTORIA.

VALVE FOR PNEUMATIC TIRES.

SPECIFICATION forming part of Letters Patent No. 631,879, dated August 29, 1899.

Application filed September 28, 1898. Serial No. 692,102. (No model.)

*To all whom it may concern:*

Be it known that I, ROBERT REID, mechanic, a subject of the Queen of Great Britain and Ireland, residing at A'Beckett street, Melbourne, in the Colony of Victoria, have invented certain new and useful Improvements in Valves for Pneumatic Tires, of which the following is a specification.

This invention relates to certain improvements in automatic valves for pneumatic tires.

The valve-shell has a main-valve chamber and a check-valve chamber separated by a perforated diaphragm. A check-valve opens and closes the opening in the diaphragm, and a chambered plug arranged in the main-valve chamber is also adapted to open and close the opening in the diaphragm and to lift the check-valve from its seat. The plug is screw-threaded on its inner end and fits a corresponding thread in the main-valve chamber. On its outer end the plug is formed with a screw-thread disposed in the opposite direction to that on the inner end of the plug. A thumb-nut or collar is formed integrally with the plug, by means of which the plug may be turned to simultaneously connect it with a pump and to operate the main valve.

Referring to the annexed sheet of explanatory drawings, Figure 1 is a section through my valve fitted to a wheel-rim; Fig. 2, an enlarged section of the operative parts of my said valve; Fig. 3, a top plan referring to Fig. 1; Fig. 4, a top plan and section through valve-shell and its tire attachments; Fig. 5, a section and top plan of the main valve; Fig. 6, an enlarged section through a cycle rim and tire, showing my valve in elevation fitted thereto; Fig. 7, a section through my valve, automatic check removed, shown fitted to the fragment of a tire and wheel-rim; and Fig. 8, a detail of the rim-mounting washer.

The parts for securing the valve in the tire and on the rim present no feature of novelty. 1 is the shell of the valve; 2, the nut for fastening the same to the rim; 3, the flange; 4, the washer, and 5 the nut for fastening the valve into the tire; 6, the double seating, which is integral with the shell of the valve and consists of a metallic diaphragm with a small central hole 7 bored through it. The lower part of the shell is tapped internally, and the main valve has a left-hand thread cut on it to work therein.

The main valve is made with a screwed tail 8, to which the pump connection is fixed, with a milled thumb-disk 9, and a conical end 10, adapted to take into the hole 7 and make an air-tight joint with the seating formed by the sharp edges of said hole. It is bored out (11) internally except at the top end 10, which is solid, and a hole 12 is pierced through the reduced part 13 of its top end to meet the hole 11.

The auxiliary or check valve consists of a conical part 14 and a double stem 15 and 16. The lower stem 15 fits loosely in the hole 7, so as to leave an air-passage, and the upper stem 16 is carried in a loose bearing 17, which is adapted to allow air to pass, and is fitted by driving tightly or screwing into the upper part 18 of the shell 1. 19 is a light brass spring in compression, set about the stem 16 and tending to keep the part 14 in contact with the seating which the sharp edge of the upper end of the hole 7 makes for it. The stem 16 is of such length that when the valve 14 is on the seating it will project slightly below the diaphragm. Fig. 1 shows the valve closed, as it appears when the tire is in use.

The mode of operation is as follows, starting from the closed position: The pump is connected in the usual way by the right-hand-screw connection 8 and the disk 9 rotated a couple of turns to the right to place the parts in the position shown in Fig. 2. The pump is now operated, the compressed air entering by the passages 11 and 12, the hole 7 through the diaphragm, and the loose bearing 17, and passing thence into the tire. At each reciprocation of the pump the check-valve 14 falls back on its seating and prevents the return of air which has passed into the tire. When sufficient pressure in the tire has been obtained, the main valve is screwed home into the position shown in Fig. 1 to close the hole 7. As the main valve approaches the closed position its point 10 acts on the stem 15, raising the valve 14 off its seating. The pump is then disconnected. It is not essential that the stem 15 should be long enough to make contact with the point 10 of the main valve so far as the pumping up of the tire is concerned; but it is essential that this device should be provided to allow of the tire being deflated. The closure is effected by clean metallic contact of a conical plug working into a circular hole with sharp edges.

By making the thread by which the valve 10 is screwed into the casing 1 opposite hand to the thread by which the pump is connected to the tail 8, a convenience is obtained, for when the pump is screwed on, the continuing of the rotation in the same direction opens the main valve, and when the valve is screwed to close, the continuing of the rotation in the same direction screws off the pump connection.

What I claim as my invention, and desire to secure by Letters Patent, is—

The combination of a valve-shell having a main-valve chamber and a check-valve chamber separated by a perforated diaphragm, a check-valve in the check-valve chamber adapted to open and close the opening in the diaphragm, a chambered plug having a conical screw-threaded inner end arranged in the main-valve chamber adapted to open and close the opening in the diaphragm and to move the check-valve from its seat, a screw-thread on the outer end of the plug formed in an opposite direction to the thread on the inner end of the plug, and a thumb-nut or collar formed integrally with the plug for turning it to simultaneously connect the plug with a pump and to operate the main valve.

In testimony whereof I have hereunto set my hand in presence of two subscribing witnesses.

ROBERT REID.

Witnesses:
R. THOMSON,
H. MACOBOY.